A. R. REYNOLDS
Axle and Axle-Box.
No. 1,883.
Patented Dec. 5, 1840.
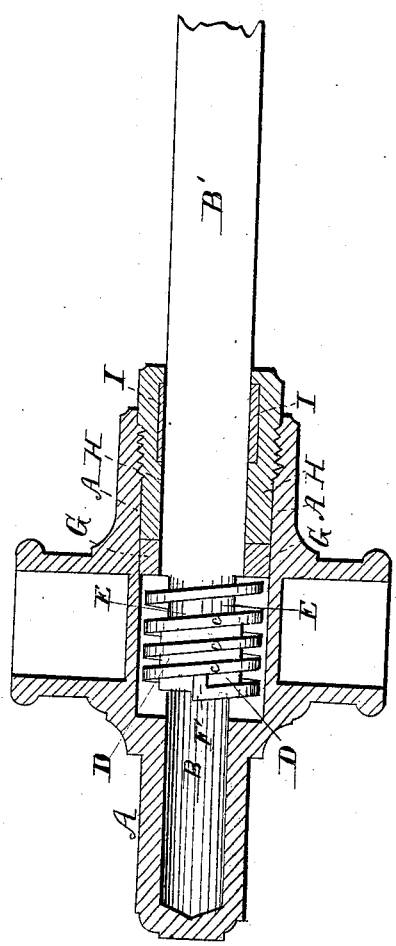

UNITED STATES PATENT OFFICE.

ASA R. REYNOLDS, OF SKANEATELES, NEW YORK.

AXLES AND BOXES FOR CARRIAGE-WHEELS.

Specification of Letters Patent No. 1,883, dated December 5, 1840.

*To all whom it may concern:*

Be it known that I, ASA R. REYNOLDS, of Skaneateles, in the county of Onondaga, in the State of New York, have invented a new and Improved Mode of Constructing the Axles and Axle-Boxes of Wheels for Carriages of Various Descriptions; and I do hereby declare that the following is a full and exact description thereof.

The object of my improvement is to obviate the injury resulting to the shoulders, or end bearings, of the axles and boxes of carriages from the continued jolts, or blows, of said end bearings against each other when a carriage is running; and also to provide for the easy repairing of such axles and boxes, when the shoulders are worn, and too great a degree of end play is thereby produced. The first of these difficulties I obviate by the insertion of spiral, or other, springs within suitable recesses formed in the axle and box, in such a manner as to cause such spring, or springs, to take off the force of the blow from the end bearings, or shoulders. The second I remedy by the insertion of a steel ring, or ferrule, which shall form a shoulder or bearing and by the renewal of which, at any time when necessary, the axle and box are rendered as perfect in their end bearings as at first.

The spiral or other springs may be inserted in various ways, and in axles and boxes of different constructions.

That which I have represented in the accompanying drawing, will serve not only to exemplify the principle upon which I proceed, but shows also a mode of arrangement which I at present prefer to any other that I have essayed.

In this drawing, the box, or hub, is represented as one half removed by a longitudinal section through its axis, for the purpose of showing the interior arrangement. The box is of the kind which forms one piece with the nave, or hub, and is furnished with mortises to receive the wooden spokes; my improvement, however, is not limited to any particular construction of box, or axle, but may be applied under proper modifications, to metal boxes and axles of every kind.

A, A, is the box, or hub, and B, B, the axle, the part B', being of larger diameter than the part B, in the proportion represented in the drawing, or in such proportion as to answer the same intention.

C, C, C, is a spiral spring of square steel, one portion of which is received into a suare screw thread, cut upon the axle, by which it is confined in place, while its other portion operates as a spring, and as such plays freely on a part of the axle upon which it fits.

D, D, is the portion of the axle upon which the screw is cut, and which, for that purpose, is made of the same diameter with the part B'. The diameter of the bottom of the screw thread is the same with that of the part B, of the axle; and between the part D, D, and the part B', there is a portion E, E, which is of the same diameter with the part B, and upon this portion the spiral spring C, C, plays freely. In affixing this spring in place it is passed onto the part B, of the axle, and is then screwed onto the thread on the part D, D, and when screwed home it is held in place by the part F, of the outer end of the spring, which part is bent at right angles for the purpose of entering a gain cut in the screw thread, into which gain it springs. The axle may then be passed into the box, and G, G, which is a steel ring, or ferrule, slipped over the portion B', of the axle; the screw ferrule, or nut, H, H, is then screwed into the box, and this fastens the whole together.

I, I, is the leather packing to keep in the oil.

The steel ring, or ferrule, G, G, against which the end of the screw ferrule G and the spring C, C, bear, is to be hardened and tempered, and as the space about the spring forms an oil chamber, this part will be perpetually lubricated; and, from this cause and the action of the spring, will be subjected to but little wear, and when any wearing of the shoulder does occur, the ferrule G, may be readily renewed. The intention with which it is at first inserted, and the object to be attained by it, are not the same with those of a common washer, although it resembles it in form.

The steel rods which I have used for my spiral springs, in boxes of the size represented in the drawing, have been about three-eighths of an inch in width, and nearly a fourth of an inch in thickness, and I have found springs of this size to be sufficiently stiff. The action of such a spring, or springs, in preventing the effect of the frequent blows, and continued vibration upon the shoulders of the axle and box, will be at once apparent, and it has been found by experience that axles and boxes constructed in the manner herein represented, and furnished with springs, have not evinced any deterioration in length of time that would have sufficed to render such axles and boxes useless when not defended by the springs.

Every competent machinist will at once perceive that I have herein exemplified the application of a spiral spring to an axle and box of a particular construction only, and it will, also, be evident that, under proper modifications, such springs are applicable to metallic axles and boxes of all kinds; whether such as are made with the outer end of the boxes solid, as in the example given, or with that end open, and the axle secured in place by a screw nut, or other device, at its fore end. In some cases, two such springs may be inserted at, or near, the opposite end of the box, and more than one steel ferrule of the kind described may be employed. I do not intend therefore, to limit myself to any particular manner of arranging these springs, further than that it shall be such as shall cause them to relieve the force applied endwise, and exerted upon the shoulders, or end bearings. I will also add, that springs other than those in a spiral form may be employed, although I account that form the best; but others may, more or less perfectly, answer the intended purpose.

The screw thread described as cut on a part of the axle, in the modification referred to, answers the purpose of a shoulder for the fore end of the spring to bear against; but this screw is only one mode of effecting this object; and in an axle box like those represented, the cutting of said screw on the axle may be omitted, together with the enlargement D, D, and a divided or double spiral spring may be inserted in the cavity constituting the oil box, one portion thereof forming a right, and the other a left-handed spiral, in order that the friction against the shoulder may be in the proper direction of such spirals.

Having thus fully described the nature and design of my improvement, and given such exemplifications thereof as will enable a skillful workman to adapt the same to metallic axles and boxes of various descriptions, I do hereby declare that I do not claim to have made any improvement in the manner of attaching such axles and boxes to each other, but intend to apply my improvement to them under all their various modifications. I confine and limit my claim, therefore, to the insertion of springs, preferring those of the spiral kind, in such manner as that said springs shall act upon the shoulders, or end bearings, of such boxes and axles, and relieve them from the immediate and injurious effect of the blows and jolts to which they are subjected when in use. And in combination with such springs, so applied.

I claim—

The application and use of hardened steel ferrules, or rings, to constitute the rubbing parts of the end bearings, as set forth.

ASA R. REYNOLDS.

Witnesses:
 Thos. P. Jones,
 James Reynolds.